United States Patent [19]

Shaw

[11] Patent Number: 5,046,776
[45] Date of Patent: Sep. 10, 1991

[54] FASCIA PROTECTOR FOR FUEL TANK FILLER

[75] Inventor: Glenn E. Shaw, Farmington, Mich.

[73] Assignee: General Motors Corporation, Detroit, Mich.

[21] Appl. No.: 660,453

[22] Filed: Feb. 22, 1991

[51] Int. Cl.$^5$ .............................................. B60R 27/00
[52] U.S. Cl. .................................. 296/97.22; 141/86; 141/390; 220/85 SP
[58] Field of Search ............... 296/97.22, 38; 280/770; 141/311 A, 86, 392, 390, 391; 220/85 E, 85 F, 85 SP, 86 R; 248/75, 79

[56] References Cited

U.S. PATENT DOCUMENTS

| | | | |
|---|---|---|---|
| 2,538,813 | 1/1951 | Wagner | 141/390 |
| 3,992,051 | 11/1976 | Hitch | 296/1 C |
| 4,537,437 | 8/1985 | Buccola | 296/1 C |
| 4,744,482 | 5/1988 | Ohsawa | 220/85 SP |
| 4,817,691 | 4/1989 | Lau | 141/390 |
| 4,830,067 | 5/1989 | Foutch | 141/390 X |

FOREIGN PATENT DOCUMENTS 82823  4/1988  Japan .................. 296/97.22

OTHER PUBLICATIONS

Drawing from unknown source of Porsche 911 fuel tank filler protector.

Primary Examiner—Margaret A. Focarino
Assistant Examiner—Joseph D. Pape
Attorney, Agent, or Firm—Raymond I. Bruttomesso, Jr.

[57] ABSTRACT

An assembly for a motor vehicle has an opening granting access to a fuel tank filler. A fascia is mounted to the motor vehicle and has a slot grant access to the opening and the fuel tank filler. The assembly has a rear fuel tank door with a pair of mounting brackets for pivotably mounting the rear fuel tank door to the motor vehicle. The rear fuel tank door has a pair of upper turned lips and a pair of square apertures. A pair of expandable plastic nuts are received by the square apertures of the rear fuel tank door. A license plate is received by the upper turned lips of the rear fuel tank door and secured to the expandable plastic nuts. A flexible splash shield is sandwiched between the license plate and the rear fuel tank door and has a pair of slits for receiving the upper turned lips and a pair of square holes that aligns and register with the square apertures and receiving the expandable plastic nuts. The flexible splash shield has a lip which depends downward and is threaded between the fascia and the motor vehicle and a pair of ribs projecting towards the rear fuel tank door for guiding the flow of fuel away from the motor vehicle whereby the fuel making contact with flexible splash shield will be directed to the slot in the rear bumper fascia.

3 Claims, 1 Drawing Sheet

FASCIA PROTECTOR FOR FUEL TANK FILLER

This invention relates to a protector for the fascia of a motor vehicle from fuel and more particularly to a flexible splash shield that mounts to the rear fuel tank door to prevent fuel from making contact with the fascia.

BACKGROUND OF THE INVENTION

It is known to have the fuel tank filler located in the rear of the vehicle behind the rear license plate. It is also known to have a pair of flanges to hold the fuel pump hose nozzle in a proper relationship to help prevent fuel spillage as disclosed in U.S. Pat. No. 4,537,437.

It is also known to have a flexible material which stores in an area near a fuel tank filler, where the fuel tank filler is located on a side of a vehicle. The flexible material is pulled out into the shape of a trough in order to channel any overflow or spilled fuel away from the vehicle.

It would be desirable to have a splash shield that mounts to the fuel tank door located at the rear of a vehicle and directs spilled fuel away from the fascia and the person fueling the vehicle, where the splash shield is both self deploying and self storing.

SUMMARY OF THE INVENTION

This invention provides an assembly for a motor vehicle having an opening granting access to a fuel tank filler. A fascia is mounted to the motor vehicle and has a slot grant access to the opening in the motor vehicle and the fuel tank filler. The assembly has a rear fuel tank door with a pair of mounting brackets for pivotably mounting the rear fuel tank door to the motor vehicle. The rear fuel tank door has a pair of upper turned lips and a pair of square apertures. A spring mounted between one of the mounting brackets and the rear fuel tank door biases the rear fuel tank door to a closed position. A pair of expandable plastic nuts are received by the square aperture of the rear fuel tank door. A license plate is received by the upper turned lips of the rear fuel tank door and secured by a pair of screws to the expandable plastic nuts. A flexible splash shield is sandwiched between the license plate and the rear fuel tank door and has a pair of slits for receiving the upper turned lips and a pair of square holes that align and register with the square apertures that receive the expandable plastic nuts. The flexible splash shield has a pair of ribs projecting towards the rear fuel tank door for arresting the flow of fuel towards the fascia and a lip which depends downward and is threaded between the fascia and the motor vehicle for guiding the flow of fuel away from the motor vehicle whereby the fuel making contact with flexible splash shield will be directed to the slot in the rear bumper fascia when the rear fuel tank door is in the closed position.

One object, feature and advantage resides in the provision of an assembly which has a flexible splash shield which is deployed when a rear fuel tank door is open.

Another object, feature and advantage resides in the provision of the flexible splash shield having a pair of ribs projecting towards a rear fuel tank door for arresting the flow of fuel towards the fascia.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
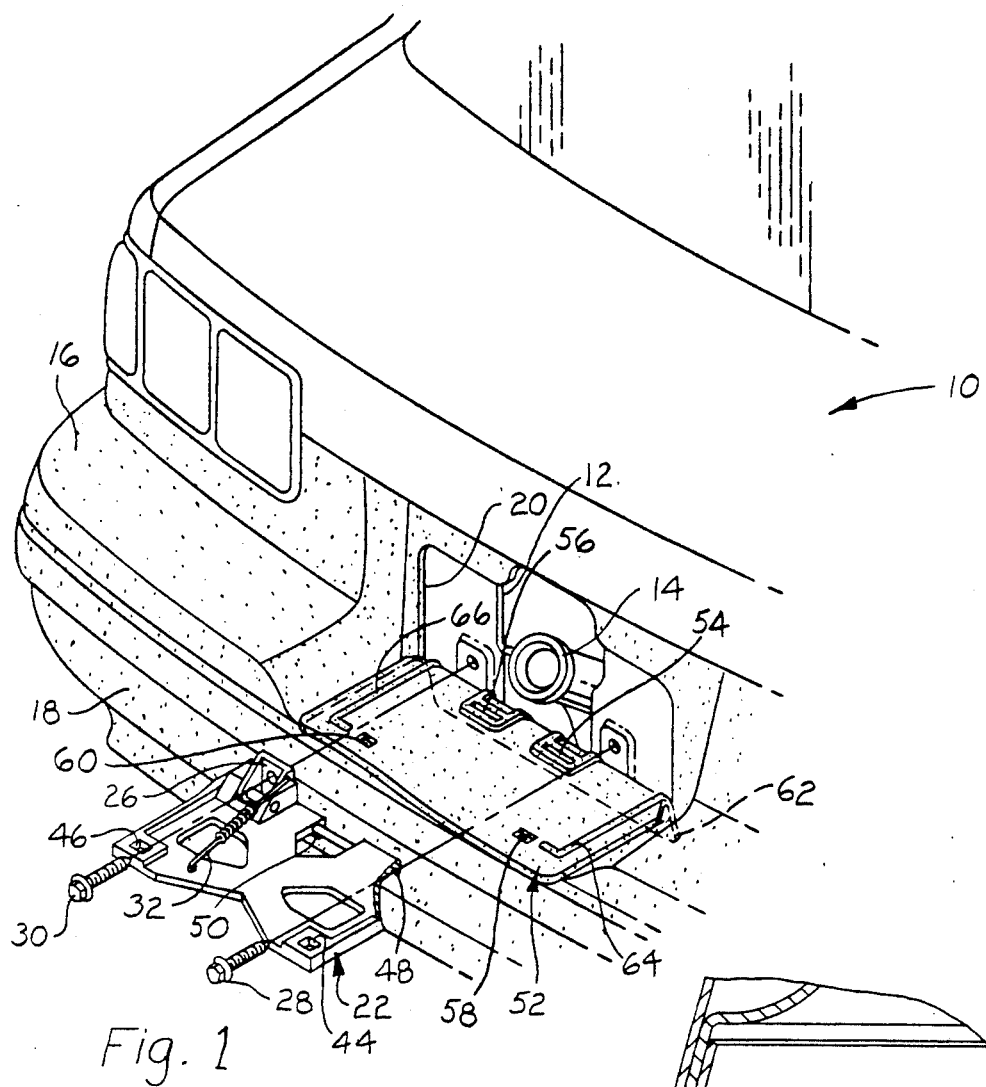
FIG. 1 is a exploded perspective view of a vehicle having a flexible splash shield according to the invention.

Referring to FIG. 1, it is seen that an opening 12 is formed on the rear of a motor vehicle 10 for granting access to a fuel tank filler 14. A fascia 16 mounts to the motor vehicle 10 and defines a bumper 18. The fascia 16 has a slot 20 which aligns with and is larger than the opening 12 in the motor vehicle 10.

Figure 2:
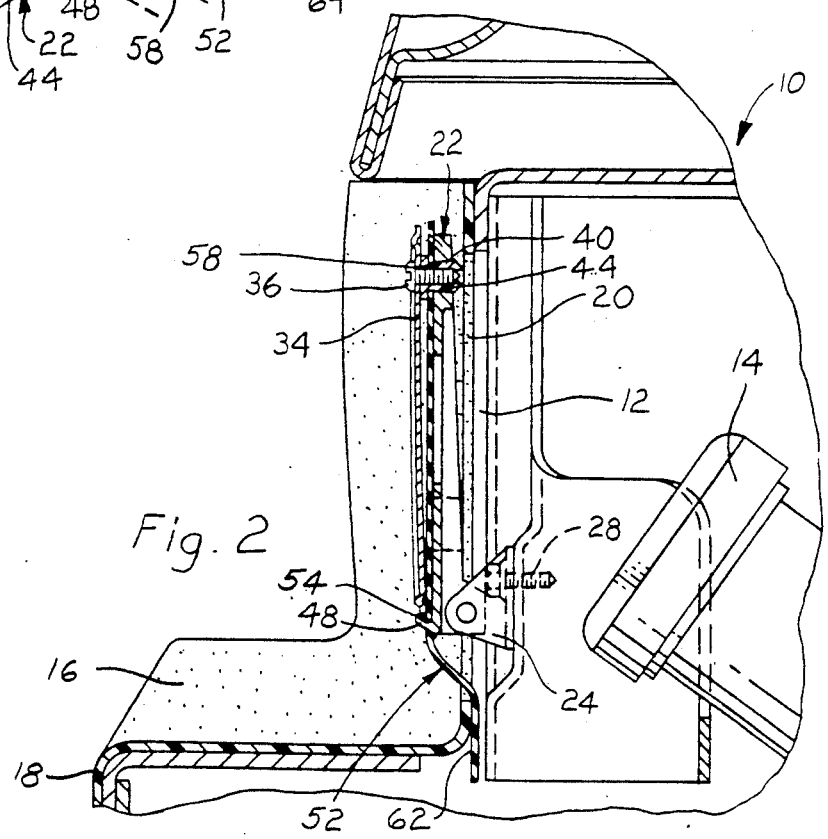
FIG. 2 is a cross-sectional view of the rear of the vehicle.

A rear fuel tank door 22 is pivotally mounted to the motor vehicle 10 by a pair of mounting brackets 24 and 26 which are secured to the motor vehicle 10 by a pair of mounting screws 28 and 30 as seen in FIG. 1. A spring 32 mounted between the rear fuel tank door 22 and the mounting bracket 26 biases the rear fuel tank door 20 towards a closed position shown in FIG. 2. Referring to FIG. 2, a pair of square apertures 44 and 46 located in the rear fuel tank door 22 receive a pair of conventional expandable plastic nuts 40, only one shown. A license plate 34 is secured to the rear fuel tank door 22 by a pair of license plate screws 36, only one shown, that are received by the pair of conventional expandable plastic nuts 40 and by a pair of upper turned lips 48 and 50 formed on the rear fuel tank door 22.

A flexible splash shield 52 made of a flexible polyvinyl chloride, or other suitable material, is sandwiched between the rear fuel tank door 22 and the license plate 34 as seen in FIG. 2. Referring to FIG. 1, the flexible splash shield 52 has a pair of slits 54 and 56 that receive the upper turned lips 48 and 50 of the rear fuel tank door 22. A pair of square holes 58 and 60 in the flexible splash shield 52 receive the conventional expandable plastic nuts 40 holding the flexible splash shield 52 to the rear fuel tank door 22. A lip 62 of the flexible splash shield 52 depends downward from the rear fuel tank door 22 and is threaded through the slot 20 of the fascia 16 and between the fascia 16 and the motor vehicle 10. Referring to FIG. 1, the flexible splash shield 52 has a pair of ribs 64 and 66 which arrest the flow of fuel thereby preventing the fuel from flowing over the sides of the flexible splash shield 52 and making contact with the fascia 16.

In operation, a nozzle, not shown, is inserted in the fuel tank filler 14. After the tank is filled to the desired level, the flow of fuel through the nozzle is terminated and the nozzle is withdrawn from the fuel tank filler 14. Any fuel that drips or splashes from the nozzle or the fuel tank filler 14 will land on the rear fuel tank door 22 or the flexible splash shield 52. The spring 32 associated with the rear fuel tank door 22 urges the door 22 to the closed position when the operator or the nozzle does not prevent this movement. With the rear fuel tank door 22 in the closed position, any fuel located on the door 22 or the flexible splash shield 52 will flow down the lip of the flexible splash shield 52 between the fascia 16 and the motor vehicle 10 to the ground below.

While an embodiment of the present invention has been explained, various modifications within the spirit and scope of the following claims will be readily apparent to those skilled in the art.

The embodiments of the invention in which an exclusive property or privilege is claimed are defined as follows:

1. In a motor vehicle having a fuel tank filler disposed behind a rear fuel tank door which is pivotably mounted to the motor vehicle, the fuel tank filler being accessible through the door, and a fascia with a slot mounted to the vehicle, the improvement comprising:
    a flexible splash shield mounted to the rear fuel tank door and having a lip which depends downward between the fascia and the motor vehicle for guiding the flow of fuel away from the motor vehicle and the fascia.

2. A splash shield assembly for a fuel tank filler of a motor vehicle located in proximity to a rear bumper fascia having a slot, and the fuel tank filler accessible by pivotable movement of a rear fuel tank door, the improvement comprising:
    a flexible splash shield mounted to the rear fuel tank door and having a pair of ribs projecting towards the rear fuel tank door for arresting the flow of fuel towards the fascia and a lip which depends downward into the slot and is threaded between the fascia and the motor vehicle for guiding the flow of fuel away from the motor vehicle whereby the fuel making contact with flexible splash shield will be directed to the slot in the rear bumper fascia.

3. An assembly for a motor vehicle having an opening granting access to a fuel tank filler and a fascia mounted to the motor vehicle having a slot grant access to the opening and the fuel tank filler, the assembly comprising:
    a rear fuel tank door having a pair of mounting brackets for pivotably mounting the rear fuel tank door to the motor vehicle and the rear fuel tank door having a pair of upper turned lips and a pair of square aperture;
    a spring mounted between one of the mounting brackets and the rear fuel tank door for biasing the rear fuel tank door to a closed position;
    a pair of expandable plastic nuts received by the square aperture of the rear fuel tank door;
    a license plate received by the upper turned lips of the rear fuel tank door and secured to the expandable plastic nuts; and
    a flexible splash shield sandwiched between the license plate and the rear fuel tank door having a pair of slits for receiving the upper turned lips and a pair of square holes that aligns and registers with the square apertures and receiving the expandable plastic nuts, and the flexible splash shield having a pair of ribs projecting towards the rear fuel tank door for arresting the flow of fuel towards the fascia and a lip which depends downward and is threaded between the fascia and the motor vehicle for guiding the flow of fuel away from the motor vehicle whereby the fuel making contact with the flexible splash shield will be directed to the slot in the rear bumper fascia when the rear fuel tank door is in the closed position.

* * * * *